UNITED STATES PATENT OFFICE.

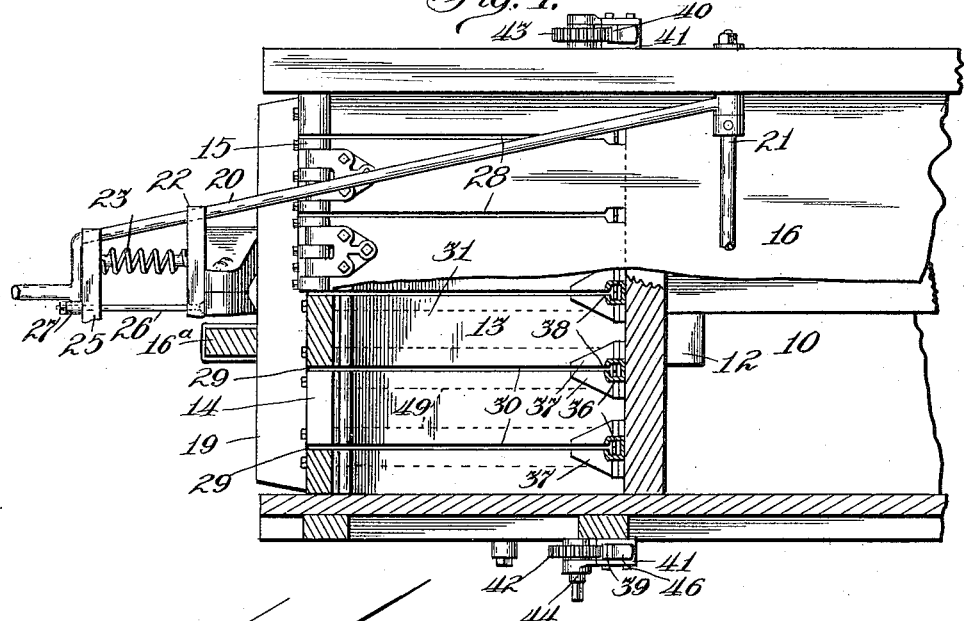

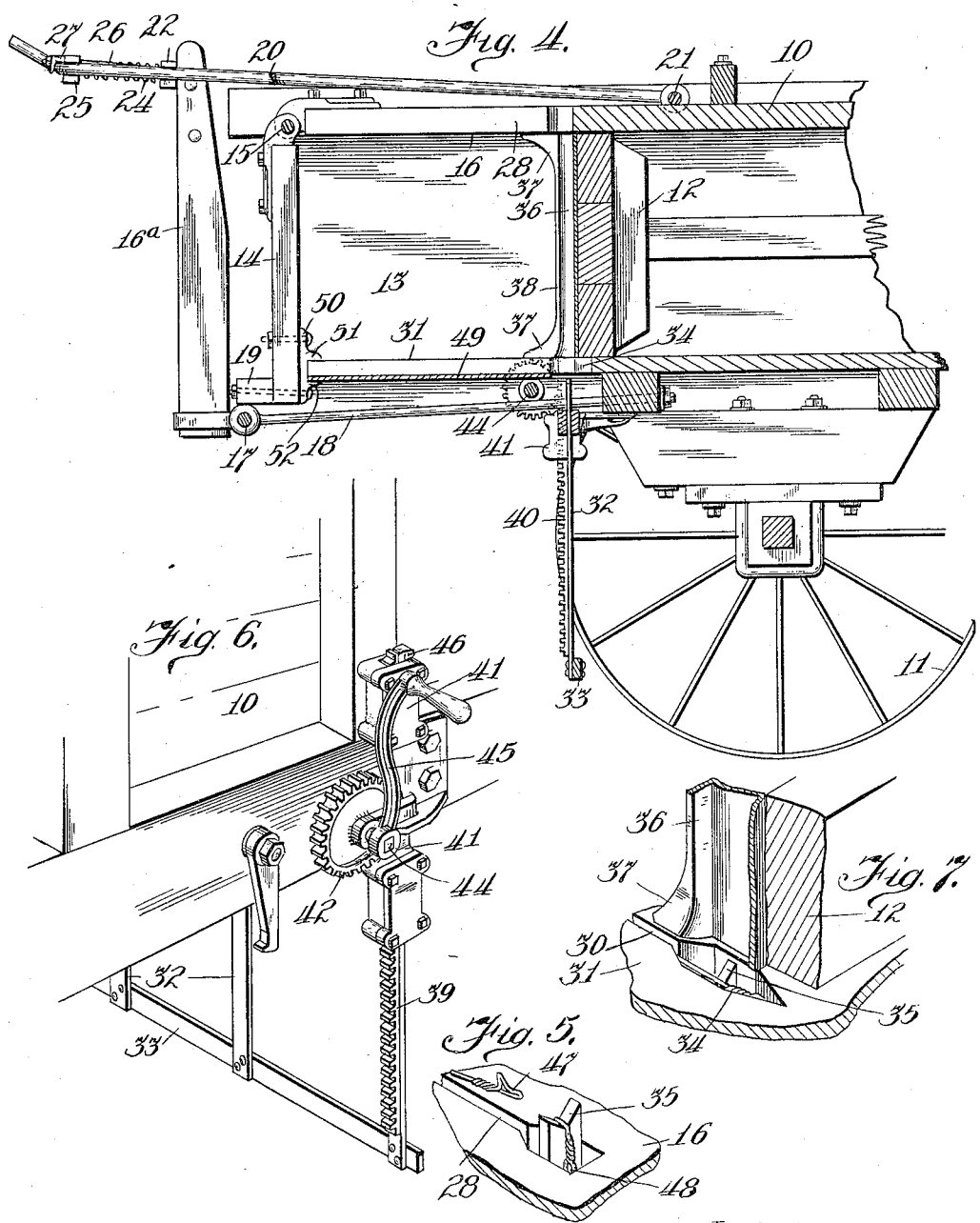

PLIN C. SOUTHWICK, OF SANDWICH, ILLINOIS.

BALING-PRESS.

1,069,586.　　　　Specification of Letters Patent.　　Patented Aug. 5, 1913.

Application filed November 11, 1908. Serial No. 462,074.

*To all whom it may concern:*

Be it known that I, PLIN C. SOUTHWICK, a citizen of the United States, and resident of Sandwich, county of Dekalb, and State of Illinois, have invented certain new and useful Improvements in Baling-Presses, of which the following is a specification, and which are illustrated in the accompanying drawings, forming a part thereof.

The invention relates more particularly to that class of baling presses in which the material is compressed against a removable bulkhead, its principal object being to provide improved means for inserting and securing the bale ties; a further object being, however, to generally improve the details of construction of the delivery end of the press.

The invention consists in the structure hereinafter described, and which is illustrated in the accompanying drawings, in which—

Figure 1 is a detail plan view of the delivery end of the press, partly in section; Fig. 2 is a detail perspective of the delivery end of the press; Fig. 3 is a detail, partly in section, of the yoke for locking the bulkhead in place; Fig. 4 is a detail vertical section of the press; Fig. 5 is a detail of the top of the press showing the manner of securing the tie; Fig. 6 is a detail showing the bottom of the press and plunger and of the tie-inserting mechanism; and Fig. 7 is a sectional detail showing the mechanism for inserting the bale ties.

The press comprises a chambered body 10, usually mounted upon wheels, one of which is shown at 11. Within the chamber of the body 10 a plunger 12 reciprocates for compressing the material within the bale chamber 13.

The bulk-head 14 forming the end of the chamber 13 is hinged, as shown at 15, across the end of the top wall 16 of this chamber and swings upwardly to permit the completed bale to be ejected. The bulk-head is secured, when closed, by an A-shaped lever 16ª, pivoted, as shown at 17, to a bracket 18 secured to the bottom of the press. The lever 16ª bears against a pressure block 19 secured to the bulk-head adjacent its lower edge. This lever is secured, when raised, by means of a yoke 20, pivoted at 21 to the top of the body 10 and swinging upwardly. This yoke carries a bearing plate 22, which is slidable upon its side members, a pair of coiled springs 23, 24, being interposed between this plate and a cross-head 25 at the outer end or crown of the yoke. A rod 26, secured to the plate 22, plays through the head 25 and has at its outer end a nut 27 for limiting its inward movement.

The bulk-head being closed and the lever 16ª raised, the yoke 20 is dropped over, its upper end thereby securely locking the bulk-head. The springs 23, 24, are so tensioned that they will yield under pressure of the plunger 12 when the bale is sufficiently compressed, thereby serving as means for indicating the completion of the bale and consequently a close approximation of the weight of the latter. In practice it is desirable to form bales of substantially uniform weight, say 200 pounds, and springs may be used and the leverage so proportioned that the bulkhead will begin to yield when the desired weight of material has been compressed within the baling chamber.

Heretofore the usual practice has been to insert the bale wires or ties by hand, and the operation has been laborious and slow. One feature of the present invention comprises a set of needles with mechanism for actuating them, whereby the wire is carried up between the compressed bale and the face of the plunger.

The usual longitudinal slots 28 are provided in the top of the bale chamber and vertical slots 29 in the bulkhead for the insertion of wires. One end of the wire having been inserted downwardly through one of the slots 28 and outwardly through one of the slots 29, is now thrust inwardly through the lower end of the slot 29 following the longitudinal channel 30 in the bottom 31 of the bale chamber, to and a little beyond the inner wall of the compressed material. A set of needles 32, carried by a cross-head 33 below the press, enter through suitable apertures 34 at the inner ends of the channels 30. These needles preferably take the form of flat bars, their widest dimension being transverse to the press and their upper ends being notched or forked, as shown at 35.

Vertical channels are formed in the front face of the plunger 12 through which the needles may travel in carrying the wire or bale-tie upwardly along the rearward face of the bale, these channels being arranged, of course, to register with the apertures 34 when the plunger is in its forward position. Preferably these channels or ways are secured by forming them in suitable castings 36, which are secured to the front face of the plunger and project forwardly therefrom as ribs. The tops and bottoms of these castings project forwardly, as shown at 37, such extensions serving the purpose of rounding the corners of the bale. This casting is also provided with a longitudinal slot 38 extending throughout its length, including the top and bottom extensions, and opening to the needle-way or channel, these slots being in register with the slots 28 and 30 in the top and bottom of the baling chamber.

The sides of the aperture 34 converge at their inner ends for the purpose of centering the wire as it is inserted through the slot 30.

The cross-head 33 is carried by a pair of rack-bars 39, 40, housed and sliding vertically in suitable brackets 41 attached to the sides of the press body. These rack-bars mesh with gears 42, 43, mounted upon a shaft 44, suitably journaled in the bottom of the press body, one or both ends of the shaft being squared for the application thereto of a suitable hand crank 45. A stop-lug 46 is formed on the upper end of each of the rack-bars for the purpose of engaging the bracket 41 to limit the downward movement of the needles.

When the material has been sufficiently compressed to form a bale, as indicated by the yielding of the springs 23, 24, the plunger is stopped in its advanced position, holding the material under compression. The wires having been inserted downwardly and outwardly in the slots 28 and 29, their lower ends are thrust into the channels 30 through the slots 29 until their inner ends strike the contracted ends of the apertures 34. The needles are now raised and each of them catching one of the wires carries it upward, its end being folded down along the rearward face of the needle as the latter enters the channel in the casting 36. As the needle emerges through the top of the press, as shown in Fig. 7, the two ends of the wire are manually engaged, thus completing the tying operation, the hook 47 being inserted in the loop 48 in the usual manner.

The slots 28, 29, and the channels 30 are most conveniently formed by spacing apart the boards of which the press body and the bulk-head are formed. In order to provide a bottom for the channels 30, plates 49 may be attached to the lower faces of the bottom boards.

Secured to the inner face of the bulk-head 14 and adjacent its lower end is a series of blocks 50, each having a pair of jaws 51, 52, which receive the outer ends of the bottom boards of the press body as the bulk-head is closed, thereby preventing spreading of the bale-chamber vertically under the baling pressure. The special function of the upper jaw 51 is to give the bale the rounded corner, as in the case of the elements 37.

I claim as my invention—

1. In a baling press, in combination, a chambered body, a swinging bulk-head closing the end of the chamber, a yoke for holding the bulk-head closed, and a spring interposed between the yoke and an appurtenance of the bulk-head.

2. In a baling press, in combination, a chambered body, a swinging bulk-head closing the end of the chamber, a lever fulcrumed on the body of the press and bearing against the bulk-head, a yoke for holding the lever, and a spring interposed between the lever and yoke.

3. In a baling press, in combination, a chambered body, a swinging bulk-head closing the end of the chamber, a lever fulcrumed on the body of the press and bearing against the bulk-head, a yoke for holding the lever, a spring interposed between the lever and yoke, and means for adjusting the tension of the spring.

4. In a baling press, in combination, a chambered body, a plunger reciprocable within the body and having channeled ribs across its face, and tie-inserting needles adapted to reciprocate in the rib channels.

5. In a baling press, in combination, a chambered body, a plunger reciprocable within the body and having channeled ribs across its face, such ribs having forward extensions at their ends, and tie-inserting needles adapted to reciprocate in the rib channels.

6. In a baling press, in combination, a chambered body, a bulk-head for closing the end of the chamber and being hinged to one wall thereof, and a jaw carried by the outer end of the bulk-head and engaging the end of the chamber wall opposite that to which the bulk-head is hinged.

PLIN C. SOUTHWICK.

Witnesses:
Louis K. Gillson,
E. M. Klatcher.